United States Patent
Sewaki

(10) Patent No.: US 7,859,434 B2
(45) Date of Patent: Dec. 28, 2010

(54) NAVIGATION DEVICE

(75) Inventor: Koji Sewaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 345 days.

(21) Appl. No.: 12/124,863

(22) Filed: May 21, 2008

(65) Prior Publication Data
US 2008/0316060 A1 Dec. 25, 2008

(30) Foreign Application Priority Data
Jun. 25, 2007 (JP) ............................. 2007-165974

(51) Int. Cl.
*G08G 1/123* (2006.01)
(52) U.S. Cl. .............................. 340/995.1; 340/995.25; 340/995.19; 701/200
(58) Field of Classification Search ............. 340/995.1, 340/995.25, 995.14, 995.17, 995.19, 995.22, 340/995.24, 995.28; 701/200, 201, 207, 701/208, 210, 214, 217
See application file for complete search history.

(56) References Cited

U.S. PATENT DOCUMENTS

| 5,852,791 | A | * | 12/1998 | Sato et al. | ................... | 701/217 |
| 7,071,843 | B2 | | 7/2006 | Hashida et al. | | |
| 7,363,146 | B2 | * | 4/2008 | Yokota | ....................... | 701/200 |
| 2005/0071081 | A1 | * | 3/2005 | Hirose et al. | ................ | 701/210 |

FOREIGN PATENT DOCUMENTS

JP 2001-041754 2/2003

* cited by examiner

*Primary Examiner*—Toan N Pham
(74) *Attorney, Agent, or Firm*—Brinks Hofer Gilson & Lione

(57) ABSTRACT

The present invention provides a navigation device in which the accuracy of placement of a displayed vehicle position mark is improved at an intersection with a small angle. The navigation device weights coefficients of road candidates for consistent matching, in determining the optimal road from a plurality of matching road candidates. Accordingly, a fluctuating display of the vehicle position mark on an incorrect road at an intersection with a small angle is prevented.

12 Claims, 6 Drawing Sheets

FIG.3(A)
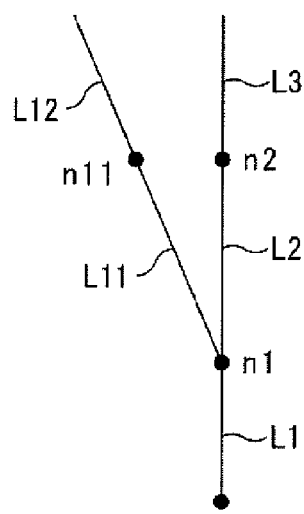
FIG.3(B)
| LINK DATA | ROAD NAME |
|---|---|
| L1 | NATIONAL ROAD ROUTE NO. X |
| L2 | NATIONAL ROAD ROUTE NO. X |
| L3 | NATIONAL ROAD ROUTE NO. X |
| ... | ... |
| L11 | PREFECTURAL ROAD ROUTE NO. Y |
| L12 | PREFECTURAL ROAD ROUTE NO. Y |
| ... | ... |
FIG.4
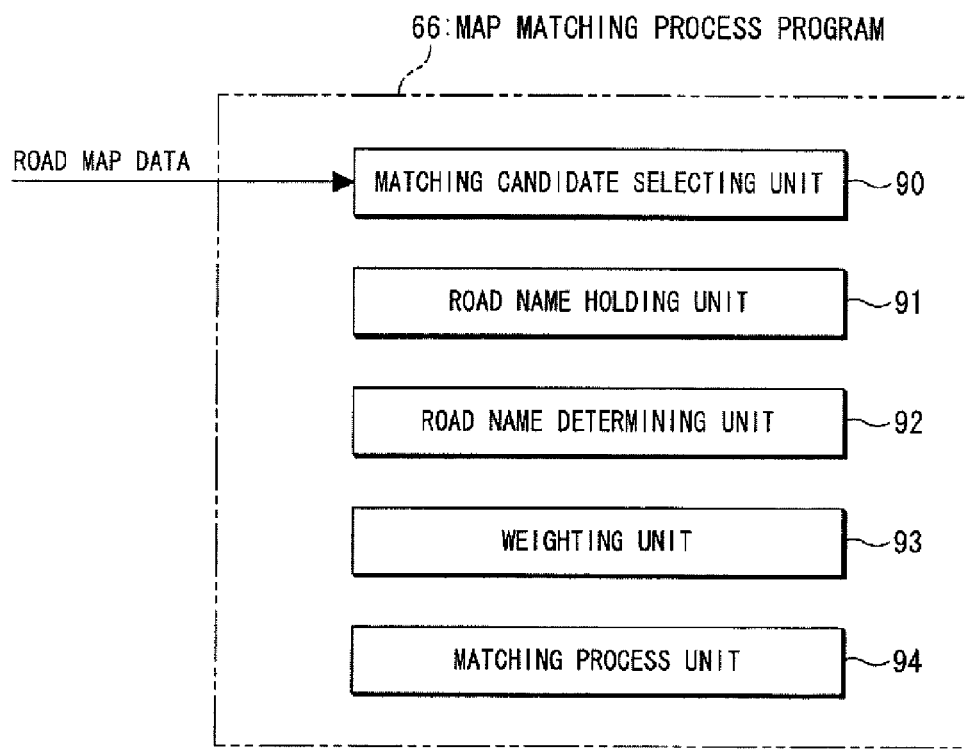

NAVIGATION DEVICE

RELATED APPLICATION

The present application claims priority to Japanese Patent Application Number 2007-165974, filed Jun. 25, 2007, the entirety of which is hereby incorporated by reference.

BACKGROUND OF THE INVENTION

1. Field of the Invention

The present invention relates to a navigation device, and more particularly relates to a method for displaying a mark of a vehicle position on a road map.

2. Description of the Prior Art

A navigation system which searches for a route to a destination and provides guidance of the searched route is known for use in a vehicle and a portable terminal. The navigation device carries out route guidance and traffic information guidance by detecting a location of a vehicle, and showing the vehicle position on a road map shown on a display. Moreover, the navigation device searches for an optimal route to a destination, shows the searched route on the display, and, at the same time, shows an estimated arrival time at the destination along the searched route.

The navigation device employs, as means for acquiring a current vehicle position, dead reckoning which determines the vehicle position by using a distance sensor and a direction sensor on the vehicle, and a method for detecting the vehicle position according to GPS positioning using satellites.

The distance sensor obtains a travel distance according to a pulse signal generated every predetermined distance the vehicle travels. The direction sensor detects an acceleration in the lateral direction by means of a gyro when a vehicle starts, stops, or turns at a curve. Though dead reckoning has an advantage of detecting the vehicle position with a simple configuration, an error is accumulated as the travel distance increases, resulting in a decrease in accuracy. Although GPS positioning can obtain the absolute position of the vehicle based on the principles of trigonometry, the positioning involves difficulty when conditions of the radio waves degrade due to obstacles such as undulated terrains, tunnels, and tall buildings.

In order to compensate for the above shortcomings, the existing navigation device employs a hybrid method which uses both dead reckoning and GPS positioning. However, even with the hybrid method, there still exists an error between the actual vehicle position and the detected vehicle position. Therefore, the navigation device uses map data, in order to align the detected vehicle position on a road in the map data and show a vehicle position mark at the aligned position.

Methods for matching the vehicle position to a road in the map data include pattern matching and projection matching. The former compares a pattern of a travel trajectory of the detected vehicle position and patterns of roads with each other, thereby selecting an optimal road, and showing the vehicle position mark on the selected road. The latter selects an optimal road based on a distance and a direction of a road with respect to the detected vehicle position, thereby showing the vehicle position mark on the selected road.

Japanese Patent Laid-Open Publication No. 2001-041754 describes a technology which uses high-precision polygon data for showing roads and intersections in an urban map, and carries out matching with the polygon data thereby improving on a deviation in display of a vehicle position mark.

Projection matching, which selects a road candidate mainly according to the conditions of the distance and the direction, does not always provide correct road selection. For example, on a branch at a small angle in which a main road and a branch road intersect at an acute angle less than 90 degrees, even if a vehicle is traveling on the main road, the vehicle position mark may temporarily be shown on the branch road. Conversely, even when the vehicle is traveling on the branch road, the vehicle position mark may temporarily be shown on the main road.

For example, as shown in FIG. 7(A), it is assumed that a main road 200 and a branch road 201 intersect at a small angle, and the vehicle travels on the main road 200. N0, N1, . . . , N7 denote detected vehicle positions, and P0, P1, . . . , P7 denote matched positions obtained by the projection matching of the detected vehicle positions N0, N1, . . . , N7 to the road, namely, positions at which the vehicle position mark is shown. For the detected vehicle positions N0, N1, and N2, the matched positions P0, P1, and P2 are correctly shown on the main road 200. However, when the vehicle reaches the branch road 201, the matched positions P3, P4, and P5 of the detected vehicle positions N3, N4, and N5 are temporarily matched to the branch road 201, and then the matched positions P6 and P7 of the detected vehicle positions N6 and N7 are again matched to the main road 200.

Moreover, as shown in FIG. 7(B), when the vehicle actually travels from the main road 200 to the branch road 201, matched positions P3 and P4 of detected vehicle positions N3 and N4 are matched to the branch road 201, then matched positions P5 and P6 of detected vehicle positions N5 and N6 are temporarily matched to the main road 200, and finally, matched position P7 of detected vehicle position N7 is matched to the branch road 201.

SUMMARY OF THE INVENTION

In the system described above, the temporary fluctuation of the display positions of the vehicle position mark at a branch point is not esthetically appealing, and may confuse a user. It is therefore an object of the present invention to provide a navigation device which solves the above problem, and thus properly shows a vehicle position mark even at a branch point or the like.

The navigation device according to the present invention includes a vehicle position detection unit that detects a vehicle position, a matching candidate selection unit that selects candidates for a road on which a vehicle position mark is to be shown from map data based on the detected vehicle position, a matching process unit that determines a road on which the vehicle position mark is to be shown based on a coefficient calculated by relative comparison of a road candidate and the vehicle position from the selected road candidates, a road name determination unit that determines whether a road name of a road candidate coincides with a road name of a road already determined by the matching process unit, a weighting unit that weights the coefficient of the road candidate that the road name determination unit determines coincides with the road name of the road determined by the matching process unit, and a display control unit that displays the vehicle position mark on the road determined by the matching process unit. Here, the road name is a name of the route such as National Road Route No. 1 and Metropolitan Expressway, and is not a link ID which identifies a road.

Preferably, the road name determination unit includes a road name holding unit that stores the road name of the road previously determined by the matching process unit, and the road name determination unit compares the road name stored by the road name holding unit with the road name of the road candidate. Moreover, the coefficient is based on at least one of a distance from the vehicle to the road candidate and a difference between the direction of the vehicle and the direction of the road candidate.

A method and a program for displaying a vehicle position mark on a navigation device according to embodiments of the present invention include: a step of detecting a vehicle position; a step of selecting candidates for a road on which a vehicle position mark is to be shown from map data based on the detected vehicle position; a step of determining whether a road name of the road candidate coincides with a road name of a road on which the vehicle position mark is shown immediately before; a step of, for a road candidate with a road name which coincides with the road name of the road on which the vehicle position mark has been shown immediately before, weighting a coefficient calculated by relative comparison of the road candidate and the vehicle position; a step of determining a road on which the vehicle position mark is to be shown from the road candidates based on the coefficients of the road candidates; and a step of showing the vehicle position mark on the determined road.

According to the present invention, accurate information of a vehicle position is provided especially at an intersection with a small angle by prioritizing road candidates having the same road name as that of a road determined immediately before when an optimal road is determined from road candidates, in order to avoid the positional fluctuation of a vehicle position mark on the map display.

BRIEF DESCRIPTION OF THE DRAWINGS

FIGS. 3(A) and 3(B) describe a relationship between link data and road names in which FIG. 3(A) is a diagram thereof, and FIG. 3(B) is a table thereof.

FIG. 4 is a functional block diagram showing a map matching process program according to the embodiment.

FIGS. 6(A) and 6(B) show examples of a vehicle position mark at a small angle branch according to the embodiment in which FIG. 6(A) shows an example of a travel on a main road, and FIG. 6(B) shows an example of a travel on a branch road.

FIGS. 7(A) and 7(B) show conventional examples of the vehicle position mark at the small angle branch in which FIG. 7(A) shows an example of the travel on the main road, and FIG. 7(B) shows an example of the travel on the branch road.

DETAILED DESCRIPTION OF THE INVENTION

A detailed description will now be given of an embodiment of the present invention with reference to drawings. The description will be given using an on-vehicle navigation device as an example.

Figure 1:
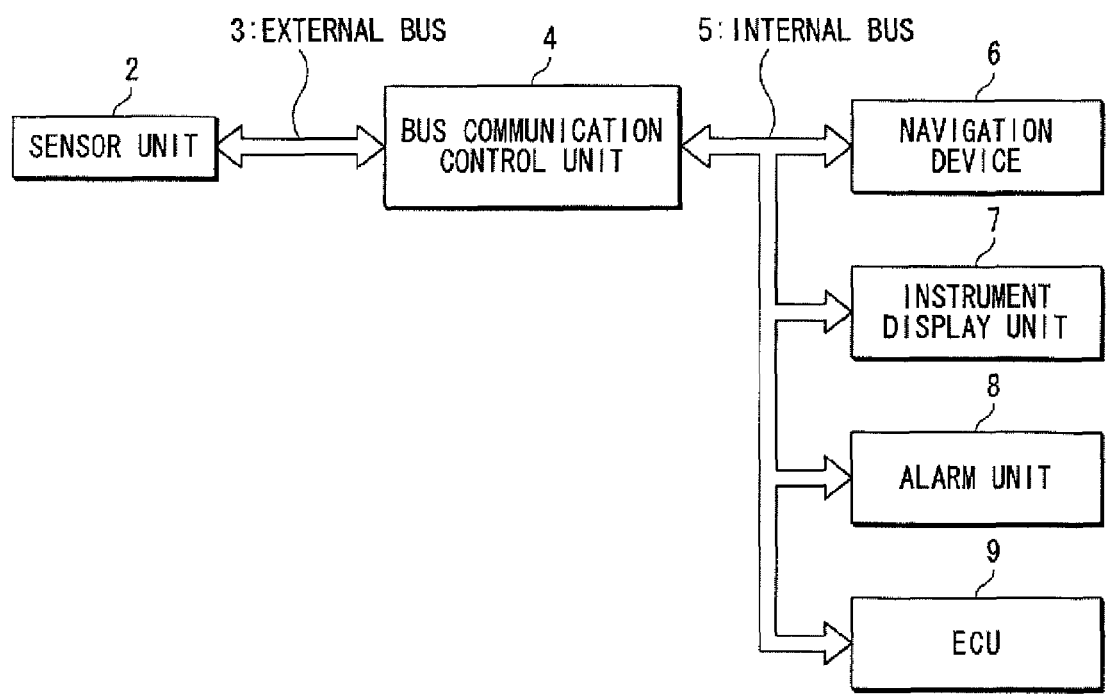
FIG. 1 is a block diagram showing a configuration of a vehicle electronic device according to an embodiment.

FIG. 1 is a block diagram showing a configuration of an on-vehicle electronic device according to the embodiment. The vehicle electronic device 1 includes a sensor unit 2, a bus communication control unit 4, an external bus 3 which connects the sensor unit 2 and the bus communication control unit 4 with each other, a navigation device 6, an instrument display unit 7, an alarm unit 8, an engine control unit (ECU) 9, and an internal bus 5 which connects the bus communication control unit 4, the navigation device 6, the instrument display unit 7, the alarm unit 8, and the ECU 9 with each other.

The sensor unit 2 may include a distance sensor which detects a speed or a distance of a vehicle, a gyro sensor which detects the direction of the vehicle, an acceleration sensor, a rotation sensor which detects a pulse signal generated according to a rotation speed of an engine, a fuel sensor which outputs a quantity of a remaining fuel, a parking sensor which detects an application/release of a parking brake, sensors which detect opening and closing of doors, and sensors which detect fastening and unfastening of seat belts.

Figure 2:
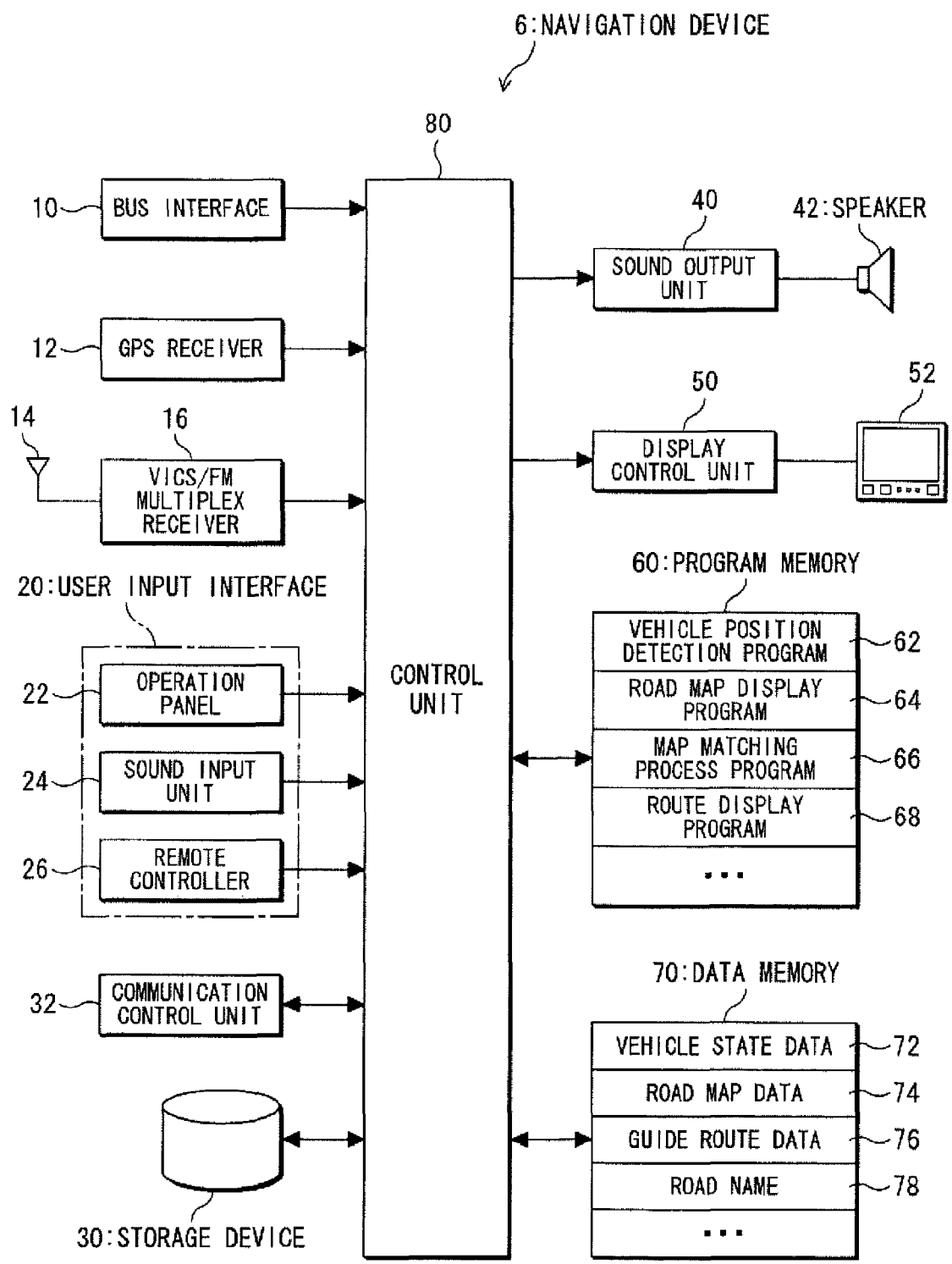
FIG. 2 is a block diagram of a navigation device shown in FIG. 1.

FIG. 2 is a block diagram showing a configuration of the navigation device 6 according to the present embodiment. The navigation device 6 includes a bus interface (bus I/F) 10 which is connected to the internal bus 5, a GPS receiver 12 which is a vehicle position detection unit, to receive radio waves from GPS satellites thereby measuring the present position and the present direction of the vehicle, a vehicle information and communication system (VICS) FM multiplex receiver 16 which receives present road traffic information from an antenna 14, a user input interface 20 (including an operation panel 22, a sound input unit 24, and a remote control operation unit 26), a storage device 30 which includes a high-capacity hard disk, a data communication control unit 32 which carries out wireless or wired data communication, a sound output unit 40 which causes a speaker 42 to output sounds, a display control unit 50 which causes a display 52 to show images, a program memory 60 which stores programs, a data memory 70 which temporarily stores data, and a control unit 80.

The user input interface 20 is provided with a map search key, a map scroll key, a route search key, a set key, and a route search start key. The storage device 30 stores programs and databases required for carrying out various functions of the navigation. The databases include road map data constituted by road data and intersection data, and facility data. The road data includes data for roads connecting intersections with each other, and includes node data which represents the longitude and latitude of a start point and an end point of roads, road types (such as expressway, national road, and general road), road widths, regulations (such as one way traffic), number of lanes, and road names. The road name includes a link ID which identifies a link as well as a name of each route, such as National Road Route No. 1 and Metropolitan Expressway.

For example, as shown in FIG. 3(A), assume that a National road route No. X includes links L1, L2, and L3 connected via nodes n1 and n2 and branches to a Prefectural road Y at the node n1, and the Prefectural road Y includes links L11 and L12 connected via a node n11. In this case, in the road data, the road names are assigned to the respective links as shown in FIG. 3(B). In other words, "National road route No. X" as the road name is assigned to the links L1, L2, and L3, and "Prefectural road route Y" is assigned to the links L11 and L12.

The display control unit 50 displays a road map of the neighborhood near the vehicle position based on the road map data, and also a vehicle position mark, a guide route, and the like which are displayed with the displayed roads.

The program memory 60 also stores programs loaded from the storage device 30. For example, the program memory 60 stores a vehicle position detection program 62 which detects the vehicle position based on the position information obtained from the sensor unit 2 and the GPS receiver 12, a road map display program 64 which displays the road map around the vehicle position based on the detected vehicle position, a map matching process program 66 which carries out the map matching of the detected vehicle position to the road data, a route display program 68 which displays a calculated guide route from a start position to a destination, and the like. The control unit 80 controls respective operations according to these programs.

The data memory 70 stores vehicle state data 72 which is obtained from the sensor unit 2 and the GPS receiver 12, road map data 74 which is data of a road map in the neighborhood of the vehicle position and is read from the storage device 30, guide route data 76 which is data of a guide route to the destination, road names 78 which are road names determined by the map matching, and the like.

FIG. 4 is a functional block diagram of the map matching process program 66 according to the present embodiment. The map matching process program 66 includes a matching candidate selecting unit 90 which selects matching candidates (road candidates) from the neighborhood road map based on the vehicle position data, a road name holding unit 91 which holds a road name of a road matched immediately before, a road name determining unit 92 which determines whether road names of the matching candidates and the road name held by the road name holding unit 91 coincide, a weighting unit 93 which weights a matching candidate having a coinciding road name, and a matching process unit 94 which selects an optimal road to be matched from the road candidates.

The matching process unit 94 determines the road to be matched from among the road candidates according to coefficients calculated based on a relative comparison of the detected vehicle position and the road candidates. When a vehicle position detected according to projection matching is matched to a road, the road is determined based on a coefficient that is calculated by the length of a perpendicular line from the detected vehicle position to the road candidate, and a difference between the detected direction of the vehicle (or a change in the direction) and the direction of the road candidate. For example, the matching process unit 94 selects a candidate with a larger coefficient (or a smaller coefficient) by carrying out a process of comparing the coefficients K1 and K2, where a coefficient K1 is calculated from a distance D1 from the detected vehicle position to the road candidate A and a direction difference H1, and a coefficient K2 is calculated from a distance D2 from the detected vehicle position to the road candidate B and a direction difference H2.

The weighting unit 93 may add a constant to the coefficient calculated for a road candidate or may multiply the coefficient by a constant thereby changing the coefficient, thereby increasing the possibility of the matching of the road candidate.

Figure 5:
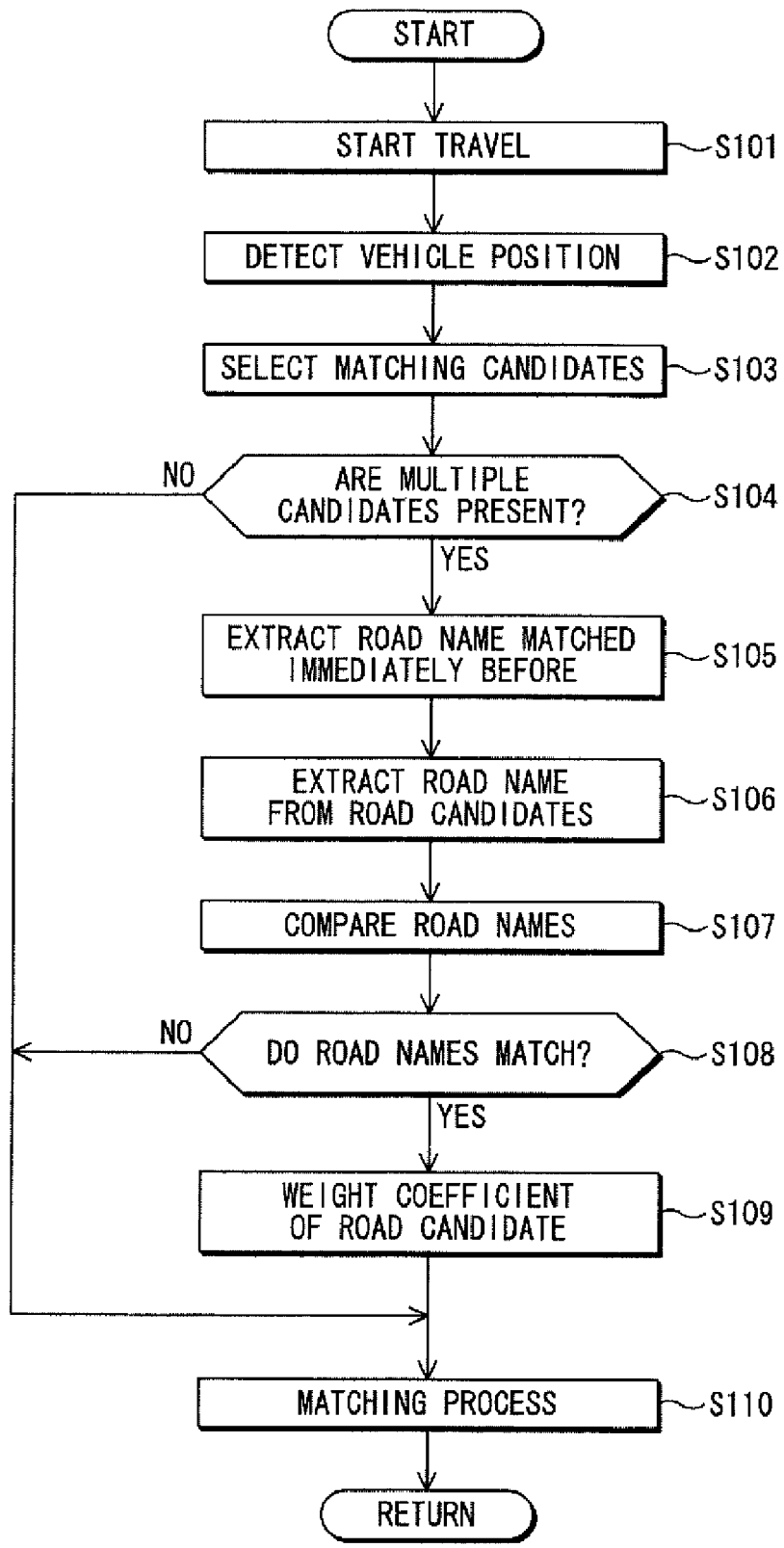
FIG. 5 is a flowchart of a map matching process according to the embodiment.

A description will now be given of the matching process in the navigation device according to the present embodiment with reference to the flowchart in FIG. 5. First, the vehicle starts traveling (step S101), the sensor unit 2 and the GPS receiver 12 detect the vehicle position accordingly (step S102), and corresponding road map data is read from the storage device 30.

Then, the matching candidate selecting unit 91 selects roads (nodes) existing within a radius "r" with respect to the detected vehicle position (step S103). If there is only one matching candidate, namely one road candidate, the vehicle position is matched to the road, and the vehicle position mark is shown on the road. On the other hand, if there are multiple matching candidates (step S104), the road name determining unit 92 reads a road name of a road which was matched immediately before and is stored in the road name holding unit 91 (step S105), reads a road name of the road candidate from the road data as shown in FIG. 3 (step S106), and compares the road name of the road matched immediately before with the road name of the road candidate (step S107).

If the road names of both roads coincide (step S108), the weighting unit 93 weights the coefficient of the road candidate (step S109), and the matching process unit 94 matches the vehicle position to the optimal road from the road candidates (step S110). In this way, the vehicle position mark is shown on the matched road.

Figure 6A:
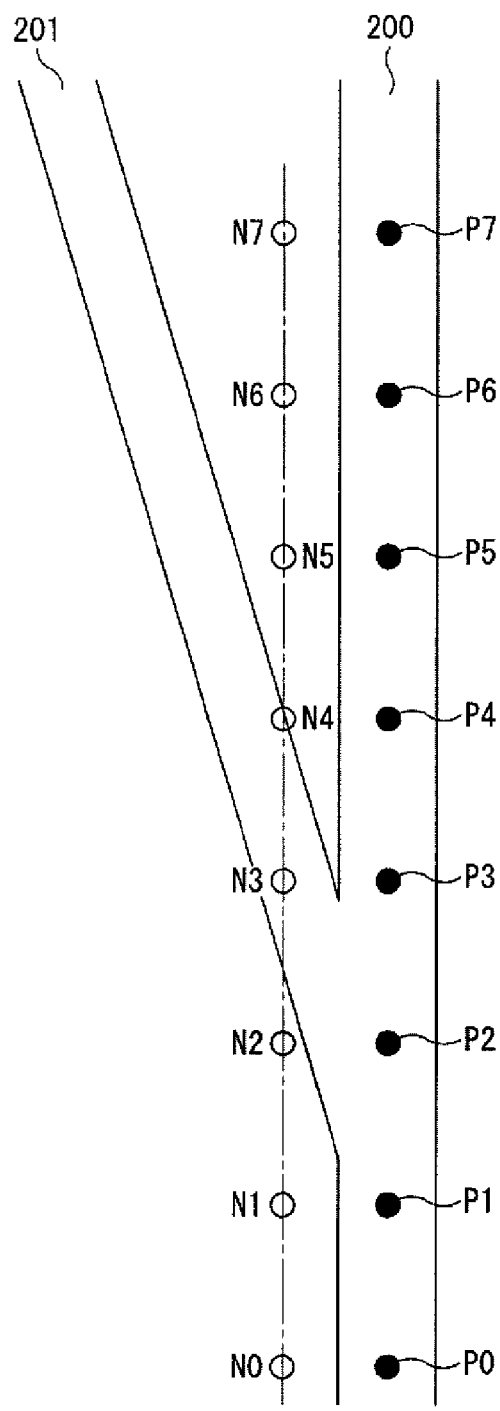

FIG. 6A is an example of a display of the vehicle position mark when the vehicle is traveling on a main road 200 at a small angle intersection, N0, N1, . . . , N7 denote detected vehicle positions, and P0, P1, . . . , P7 denote matched positions obtained by projection matching of the detected vehicle positions N0, N1, . . . , N7 to the road, namely, positions at which the vehicle position mark is shown.

Figure 7A:
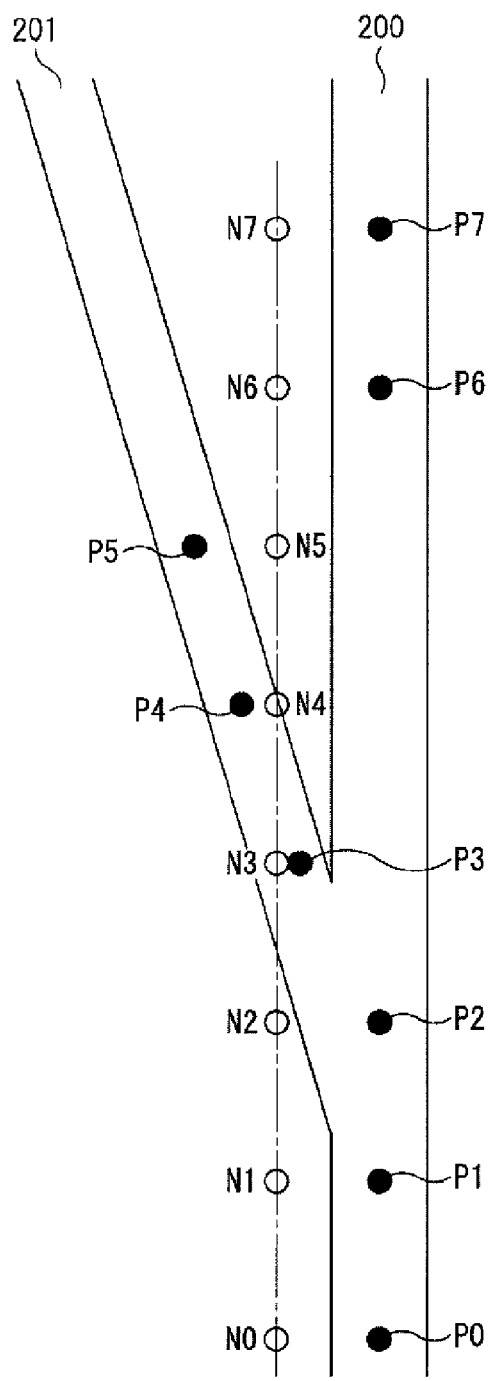

According to the conventional map matching process, as shown in FIG. 7A, for the detected vehicle positions N0, N1, and N2, matched positions P0, P1, and P2 are correctly shown on the main road 200. When the vehicle reaches the branch road 201, the detected vehicle positions N3, N4, and N5 are close to the branch road 201, and are thus temporarily matched to the branch road 201. Then, the detected vehicle positions N6 and N7 are matched again to the main road 200.

Conversely, according to the map matching process of the present embodiment, when the vehicle reaches the branch road 201, although road candidates to which the detected vehicle position N3 is matched are the main road 200 and the branch road 201, since the road matched immediately before is the main road 200, the coefficient of the road candidate coinciding therewith is weighted. Therefore, although the detected vehicle position N3 is close to the branch road 201, the detected vehicle position N3 is matched to the main road 200. Similarly, the detected vehicle positions N4 and N5 are matched to the main road 200. As a result, at a branch of a small angle, the conventional fluctuation of the vehicle position mark is prevented on the map display.

Figure 7B:
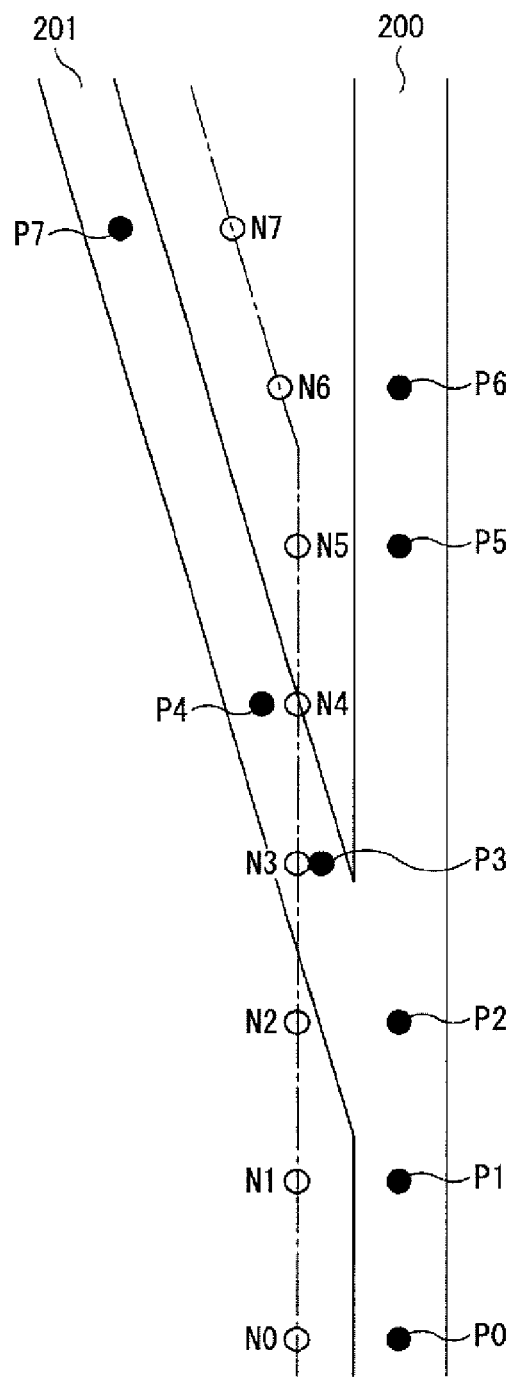

Moreover, according to the conventional map matching process shown in FIG. 7B, when the vehicle travels from the main road 200 to the branch road 201, the detected vehicle positions N3 and N4 are matched to the branch road 201, the detected vehicle positions N5 and N6 are matched to the main road 200, and, finally, the detected vehicle position N7 is matched to the branch road 201.

Figure 6B:
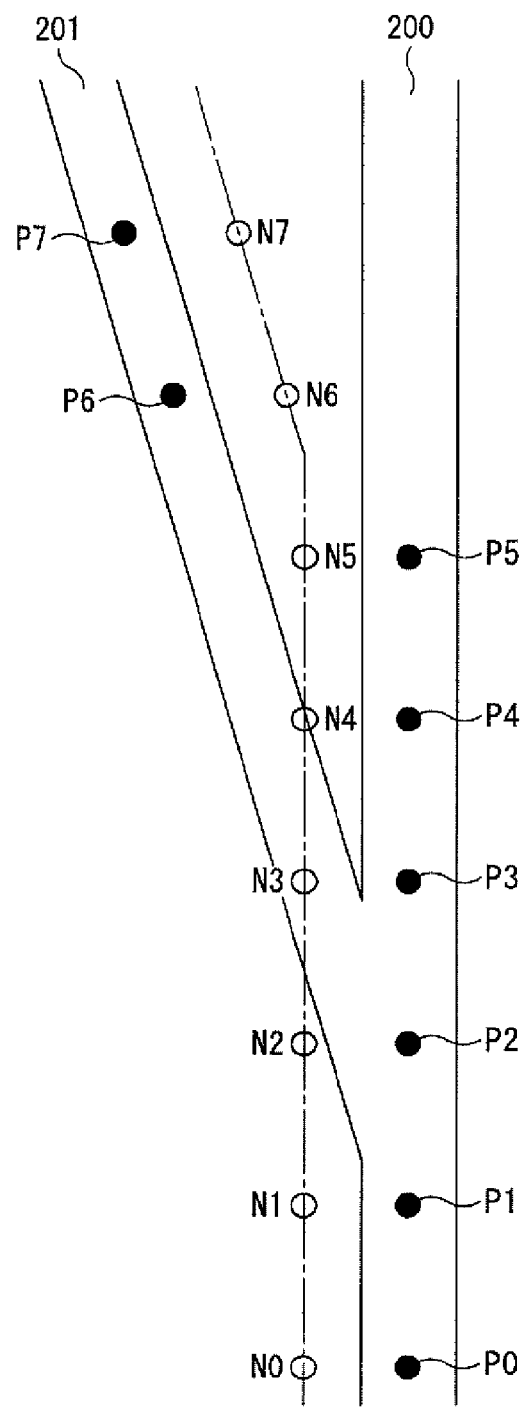

Conversely, according to the map matching process of the present embodiment, as shown in FIG. 6B, the detected vehicle positions N3 and N4 are not matched to the branch road 201, which is closer in distance, but are matched to the main road 200. Then, the detected vehicle position N6 is finally matched to the branch road 201. Therefore, the frequent fluctuation of the matched position, namely the display of the vehicle position mark, is prevented at an intersection with a small angle.

Although the above embodiment exemplifies a case in which roads are a main road and a branch road, the road may be an expressway. Moreover, the present invention may be applied to any branch point at which roads intersect at an acute angle of less than 90 degrees.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation device comprising:
   a vehicle position detection unit that detects a vehicle position;
   a matching candidate selection unit that selects candidates for a road on which a vehicle position mark is to be shown from map data based on the detected vehicle position;
   a matching process unit that determines the road on which the vehicle position mark is to be shown based on a coefficient calculated by relative comparison of a road candidate and the vehicle position from the selected road candidates;
   a road name determination unit that determines whether a road name of the road candidate coincides with the road name of the road previously determined by said matching process unit;
   a weighting unit that weights the coefficient of the road candidate that said road name determination unit determines has the road name which coincides with the road name of the road previously determined by said matching process unit; and
   a display control unit that displays the vehicle position mark on the road determined by said matching process unit.

2. The navigation device according to claim 1, wherein said road name determination unit comprises a road name holding unit that stores the road name of the road previously determined by said matching process unit, and said road name determination unit compares the road name held by said road name holding unit and the road name of the road candidate.

3. The navigation device according to claim 1, wherein the coefficient is based on at least one of a distance from the vehicle to the road candidate or a difference between the direction of the vehicle and the direction of the road candidate.

4. The navigation device according to claim 3, wherein said weighting unit carries out the weighting only when the difference between the direction of the vehicle and the direction of the road candidate is equal to or less than 90 degrees.

5. A method for displaying a vehicle position mark on a navigation device, comprising:
   detecting a vehicle position;
   selecting candidates for a road on which the vehicle position mark is to be shown from map data based on the detected vehicle position;
   determining whether a road name of the road candidate coincides with the road name of the road on which the vehicle position mark has been shown immediately before;
   for the road candidate it is determined that the road name of which coincides with the road name of the road on which the vehicle position mark has been shown immediately before, weighting a coefficient calculated by relative comparison of the road candidate and the vehicle position;
   determining the road on which the vehicle position mark is to be shown from the road candidates based on the coefficients of the road candidates; and
   showing the vehicle position mark on the determined road.

6. The method for displaying a vehicle position mark according to claim 5, wherein said act of determining road name coincidence comprises storing the road name of the road on which the vehicle position mark has been shown immediately before, and comparing the stored road name with the road name of the road candidate.

7. The method for displaying a vehicle position mark according to claim 5, wherein the coefficient is based on at least one of a distance from the vehicle to the road candidate and a difference between the direction of the vehicle and the direction of the road candidate.

8. The method for displaying a vehicle position mark according to claim 7, wherein said act of weighting carries out the weighting only when the difference between the direction of the vehicle and the direction of the road candidate is equal to or less than 90 degrees.

9. A computer readable storage medium containing a program for displaying a vehicle position mark on a navigation device, the execution of said program effecting the acts comprising:
   detecting a vehicle position;
   selecting candidates for a road on which the vehicle position mark is to be shown from map data based on the detected vehicle position;
   determining whether a road name of the road candidate coincides with the road name of the road on which the vehicle position mark is shown immediately before;
   for the road candidate it is determined that the road name of which coincides with the road name of the road on which the vehicle position mark has been shown immediately before, weighting a coefficient calculated by relative comparison of the road candidate and the vehicle position;
   determining the road on which the vehicle position mark is to be shown from the road candidates based on the coefficients of the road candidates; and
   showing the vehicle position mark on the determined road.

10. The computer readable storage medium according to claim 9 wherein said act of determining road name coincidence comprises storing the road name of the road on which the vehicle position mark has been shown immediately before, and comparing the stored road name with the road name of the road candidate.

11. The computer readable storage medium according to claim 9 wherein the coefficient is based on at least one of a distance from the vehicle to the road candidate and a difference between the direction of the vehicle and the direction of the road candidate.

12. The computer readable storage medium according to claim 11 wherein said act of weighting carries out the weighting only when the difference between the direction of the vehicle and the direction of the road candidate is equal to or less than 90 degrees.

* * * * *